Aug. 6, 1929. P. W. LEHMAN 1,723,563
MANUFACTURE OF PNEUMATIC TIRE CASINGS
Filed Feb. 16, 1927  2 Sheets-Sheet 1
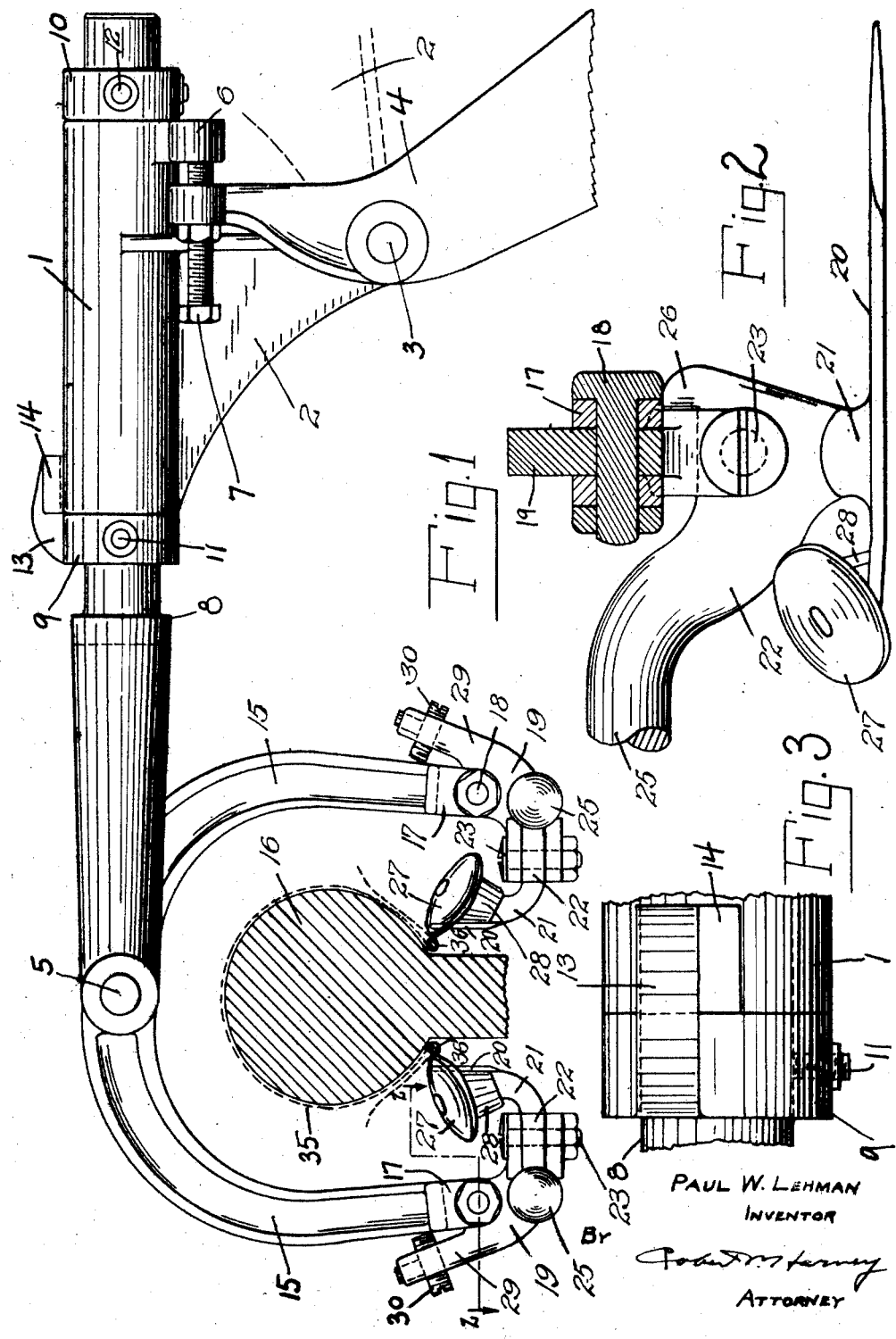
PAUL W. LEHMAN
INVENTOR
ATTORNEY

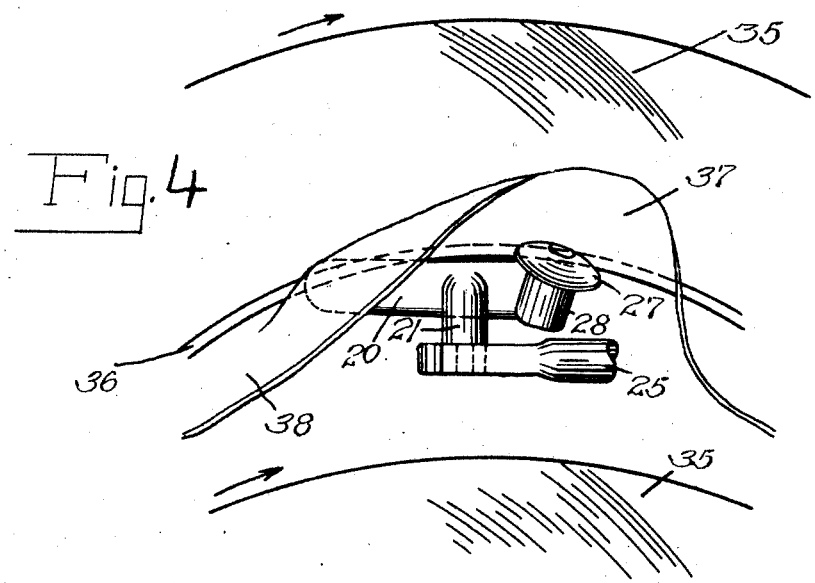
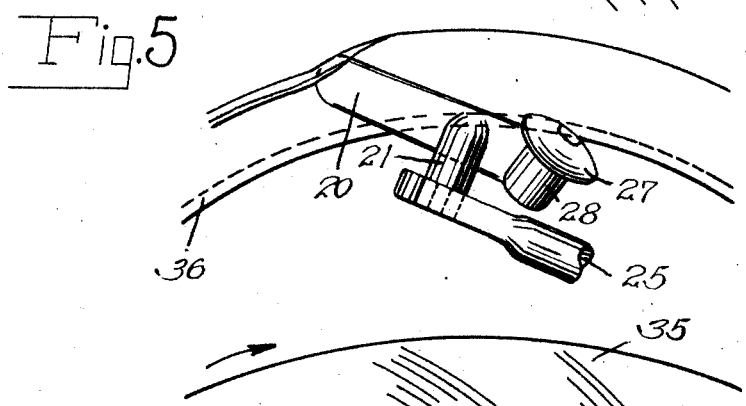
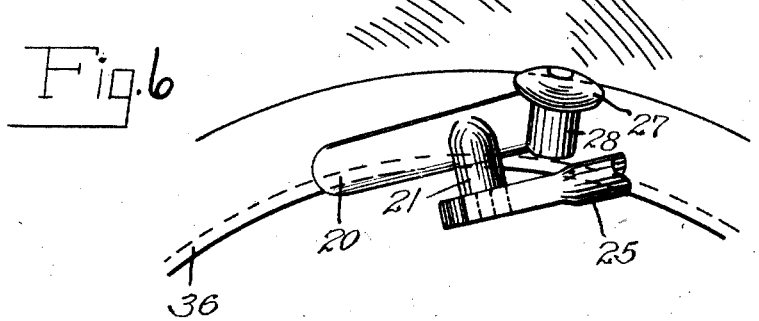

Patented Aug. 6, 1929.

1,723,563

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

MANUFACTURE OF PNEUMATIC-TIRE CASINGS.

Application filed February 16, 1927. Serial No. 168,714.

My invention relates to the manufacture of pneumatic tire casings and more particularly to the forming of the carcass material about the bead portions of the casing. According to one method of building pneumatic tire casings a band of material, usually two plies of cord fabric, is formed about a suitable core, a preformed annular bead core is then placed in position adjacent the edge of the plies and the latter turned back to inclose the bead. This operation has previously been performed by a hand tool first on one side of the core and then the other. It is among the objects of my invention to provide a device which will turn back the fabric on both sides of the core simultaneously. A further object is the attainment of a better and more uniform bead structure with a decrease in the required skill on the part of the operator.

In the accompanying drawings which illustrate one embodiment of my invention

Figure 1 is a front elevation showing my device in operative relation with the building core the latter shown in cross section, Figure 2 is a detail plan view of one of the turnback blades and stitchers, substantially on line 2—2 of Figure 1, Figure 3 is a detail plan view of a stop member and Figures 4, 5 and 6 are diagrammatic side views showing the manner of operation.

Referring to the drawings 1 designates a cylindrical bearing formed integral with a triangular bracket 2 pivoted at 3 to a standard 4 secured to the frame of the tire building machine, not shown. Bearing 1 is provided with a downwardly projecting lug 6 adapted to engage an adjustable stop screw 7, threaded in standard 4, when the device is in operative position as shown in Figure 1. When not in use bearing 1 and the parts carried thereby may be swung back out of the way as indicated in dotted lines. An arm 8 is rotatably mounted in bearing 1, and is adjustably held against longitudinal movement therein by collars 9 and 10 releasably secured to the arm by set screws 11 and 12. Collar 9 is preferably provided with a lug 13 adapted to engage a stop 14 secured to bearing 1 to limit the rotation of arm 8.

Pivoted to the free end of arm 8 at 5 are two depending arms 15 adapted, in operative position, to embrace the core 16 as shown in Figure 1. Arms 15 are provided at their lower ends with forks 17 in which are pivoted, on bolts 18, members 19 carrying the turnback devices. These devices comprise turnback blades 20 secured intermediate their length at 21 to supports 22 pivoted at 23 in members 19. Supports 22 are provided with operating handles 25 and with a stop 26, the latter adapted to engage members 19 to limit the rotation of supports 22 about pivots 23. Angularly positioned stitcher rolls 27 are rotatably mounted in bearings 28 secured to the rear end of blades 20.

Members 19 are provided with upstanding arms 29 through which are threaded screws 30 adapted to engage arms 15 and forming adjustable stops to limit the rotation of members 19 about pivots 18.

The operation is as follows. A ply or plies of carcass material 35 having been formed about the core 16 and bead cores 36 having been placed in position, the operator, by hand, turns back a portion of the fabric depending below the bead, as shown at 37 in Figure 4. Arm 8 with its associated parts is then swung into operative position as shown in Figures 1 and 4 and the blades 20 and stitchers 27 are rotated into position opposite portions 37. As shown in the latter figures, at the start of the operation the stitcher 27 engages the bead and the end of blade 20 engages the fabric closely adjacent the bead. The core is then set in rotation as indicated by the arrows in Figures 4, 5 and 6. As the core continues to rotate the operator while keeping blade 20 and roll 27 pressed against the casing bears down on handles 25 to rotate arm 8 slightly in bearing 1 thus raising the points of blades 20 as indicated in Figure 5, to lay the depending portion 38 of the fabric back against the side of the carcass. The handles 25 are then raised to carry rolls 27 upwardly along the sides of the casing and stitch the turned back portion of the fabric firmly in place, as shown in Figure 6.

As will be evident bearing 1 and pivots 5, 18 and 23 permit a substantially universal movement of the blades 20 and stitchers 27 with respect to the core. Adjustable collars 9 and 10 permit pivot 5 to be centered above the core and stops 30 may be adjusted to assure that stitchers 27 will properly engage the bead cores at the start of the operation which, together with the fact that both beads are engaged simultaneously, assures a firm smooth tight application of the fabric about the bead core. The stitchers continue to hold the beads in position during the operation of blades 20 and then act as stitchers to firmly stitch the fabric against the side of the casing. The result is a more uniform product than can be obtained by hand methods and a firm tight bead construction which substantially assists in the placing of the bead rings in the subsequent molding and curing operations.

I claim:

1. A device of the character described comprising a turning blade adapted to be positioned adjacent the bead portion of a rotatable tire building core, and a stitching roll positioned at an angle to the plane of the core associated with said blade, said blade and roll being mounted for substantially universal movement with respect to the core.

2. A device of the character described comprising a turning blade, adapted to be positioned adjacent the bead portion of a rotatable tire building core, a bearing formed on the heel of said blade and a freely rotatable stitching roll journaled in said bearing and at an angle to the plane of the core, said blade and roll being mounted for substantially universal movement with respect to the core.

3. A device of the character described comprising turning blades adapted to be simultaneously positioned on opposite sides of a rotatable building core and adjacent the bead portion of the latter, and stitching rolls associated with each of said beads, said blades and rolls positioned at an angle to the plane of the core being mounted for substantially universal movement with respect to said core.

4. A device of the character described comprising turning blades adapted to be simultaneously positioned on opposite sides of a rotatable tire building core and adjacent the bead portions of the latter, bearings formed on the heels of said blades and freely rotatable stitching rolls journaled in said bearings and at an angle to the plane of the core, said blade and roll being mounted for substantially universal movement with respect to said core.

5. A device of the character described comprising a stitching roll adapted to engage the bead of a tire carcass supported on a rotatable core, means operable while the bead is so engaged to turn those portions of the carcass fabric below the bead about the latter and against the tire carcass and means to thereafter move said stitching roll across the turned back portion of the carcass fabric.

6. A device of the character described comprising stitching rolls adapted to simultaneously engage the beads of a tire carcass supported on a rotatable core, means operable while the beads are so engaged to simultaneously turn those portions of the carcass fabric below the beads about the latter and against the sides of the tire carcass and means to thereafter move said stitching rolls across the turned back portion of the beads.

7. A device of the character described comprising a stitching roll positioned to initially engage the outer surface of the bead of a tire carcass supported on a rotatable core, a turning blade associated with the stitching roll, means to move the blade across the face of the bead and the adjacent portion of the tire carcass while maintaining the stitcher roll in contact with the bead, said means thereafter operative to move the stitching roll across the face of the bead and the adjacent portion of the tire carcass.

8. A device of the character described comprising a stitching roll and a turning blade associated therewith adapted to be initially positioned with the point of the blade and the stitcher roll engaging the outer surface of the bead of a tire carcass supported on a rotatable core, and a pivotal support for the blade and roll so positioned with respect to the core that movement of the support about its pivot in one direction moves the blade across the face of the bead and the adjacent portion of the tire carcass and that movement in the opposite direction moves the stitcher roll across the face of the bead and the adjacent portion of the tire carcass.

In testimony whereof I have signed my name to the above specification.

PAUL W. LEHMAN.